(12) United States Patent
Rai et al.

(10) Patent No.: US 9,937,503 B2
(45) Date of Patent: Apr. 10, 2018

(54) NANOFLUIDS FOR HEAT TRANSFER APPLICATIONS

(75) Inventors: Beena Rai, Pune (IN); Abhinandan Chiney, Pune (IN); Vivek Ganvir, Pune (IN); Pradip, Pune (IN)

(73) Assignee: TATA CONSULTANCY SERVICES LIMITED, Maharashtra (IN)

( * ) Notice: Subject to any disclaimer, the term of this patent is extended or adjusted under 35 U.S.C. 154(b) by 1081 days.

(21) Appl. No.: 14/241,263

(22) PCT Filed: Dec. 8, 2011

(86) PCT No.: PCT/IN2011/000843
§ 371 (c)(1),
(2), (4) Date: Sep. 10, 2014

(87) PCT Pub. No.: WO2013/030845
PCT Pub. Date: Mar. 7, 2013

(65) Prior Publication Data
US 2015/0048272 A1 Feb. 19, 2015

(30) Foreign Application Priority Data
Aug. 26, 2011 (IN) .......................... 2410/MUM2011

(51) Int. Cl.
*B02C 23/00* (2006.01)
*B02C 23/06* (2006.01)
*C09K 5/10* (2006.01)
*B02C 23/36* (2006.01)
*B02C 25/00* (2006.01)

(52) U.S. Cl.
CPC .............. *B02C 23/06* (2013.01); *B02C 23/36* (2013.01); *B02C 25/00* (2013.01); *C09K 5/10* (2013.01)

(58) Field of Classification Search
CPC .......... B02C 23/26; B02C 23/36; B02C 25/00

USPC .......................................................... 241/21
See application file for complete search history.

(56) References Cited

U.S. PATENT DOCUMENTS

| 7,470,650 B2 | 12/2008 | Zhang et al. |
| 2006/0027484 A1 | 2/2006 | Leck et al. |
| 2009/0180976 A1 | 7/2009 | Seeney et al. |
| 2012/0156494 A1 | 6/2012 | Wolfrum et al. |

FOREIGN PATENT DOCUMENTS

DE 10 2009 037 992 A1 2/2011

OTHER PUBLICATIONS

Harjanto et al., "Synthesis of $TiO_2$ Nanofluids by Wet Mechanochemical Process," *AIP Conference Proceedings* 1415(1):110-113, 2011. (4 pages).
International Search Report, dated Nov. 6, 2012, for PCT/IN2011/000843, 3 pages.

*Primary Examiner* — Faye Francis
(74) *Attorney, Agent, or Firm* — Seed IP Law Group LLP

(57) ABSTRACT

According to an implementation of the present subject matter, a method for producing stable nanofluids is described. The method includes mixing of a base fluid with a dispersant and a metal oxide powder to form a primary mixture. The base fluid is a heat transfer fluid and the metal oxide powder includes particles of size greater than 100 nm. The method further includes grinding the primary mixture to obtain a concentrated nanoparticle suspension where the dispersant is added to the primary mixture during the grinding after every pre-determined time period.

14 Claims, 2 Drawing Sheets

NANOFLUIDS FOR HEAT TRANSFER APPLICATIONS

TECHNICAL FIELD

The present subject matter relates, in general, to method of enhancing heat transfer in fluids and, in particular, to nanofluids for use in heat transfer applications.

BACKGROUND

Many industrial and consumer products require the process of heat transfer for continuous and un-interrupted working. Convective heat transfer can be enhanced passively by changing flow geometry, boundary conditions, or by enhancing thermal conductivity of the heat transfer fluid. As extended surface technology has already been adapted to its limits in the design of thermal management systems, technologies with the potential to improve a fluid's thermal properties, such as conductivity, are of great importance.

Scientists and engineers have been working for decades to develop more efficient heat transfer fluids for use in car motors and industrial equipments. Improved oils and coolants would make possible more efficient machines and better engines. Such machines and engines would be smaller and cheaper, and their lower fuel demands and emissions would do less damage to the environment. More efficient heat transfer fluids may also solve a number of problems plaguing the heating, ventilation and air conditioning (HVAC) industry, improve the efficiency of high-heat flux devices like supercomputers, and provide new cancer treatment techniques. Many such requirements and continuous research has led to the development of nanofluids for heat transfer. Usual heat transfer fluids, also referred to as base fluids, with suspended ultra fine particles of nanometer size are named as nanofluids.

Nanofluids are typically engineered by suspending nano particles, preferably those possessing higher thermal conductivity, such as carbon, metal and metal oxides, with average sizes below 100 nanometer (nm) in traditional heat transfer fluids, such as water, oil, and ethylene glycol. Nanofluids form a new class of nanotechnology based heat transfer fluids that are expected to exhibit thermal properties superior to those of their host fluids or conventional particle fluid suspensions. Nanofluids prepared conventionally for the purpose of heat transfer applications have only been prepared in small quantities and at lab scale with limited stability and for trial purposes, but are not yet commercially available.

SUMMARY

This summary is provided to introduce concepts related to method of enhancing heat transfer in fluids, which is further described below in the detailed description. This summary is not intended to identify essential features of the claimed subject matter nor is it intended for use in determining or limiting the scope of the claimed subject matter.

In one embodiment of the present subject matter, method(s) for producing stable nanofluids are described. The method includes mixing a base fluid with a dispersant and a metal oxide powder to form a primary mixture where the base fluid may include any heat transfer liquid known in the art. The metal oxide powder added to the base fluid includes particles of one or more metal oxides, where the particles are of an average size greater than 100 nm. The primary mixture is ground to obtain a concentrated nano-particle suspension having metal oxide particulates of size less than 100 nm where the dispersant is added to the primary mixture during the grinding after every pre-determined time period.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the figures to reference like features and components. Some embodiments of the method(s) in accordance with the present subject matter are described, by way of example only, and with reference to the accompanying figures, in which.

Figure 1:
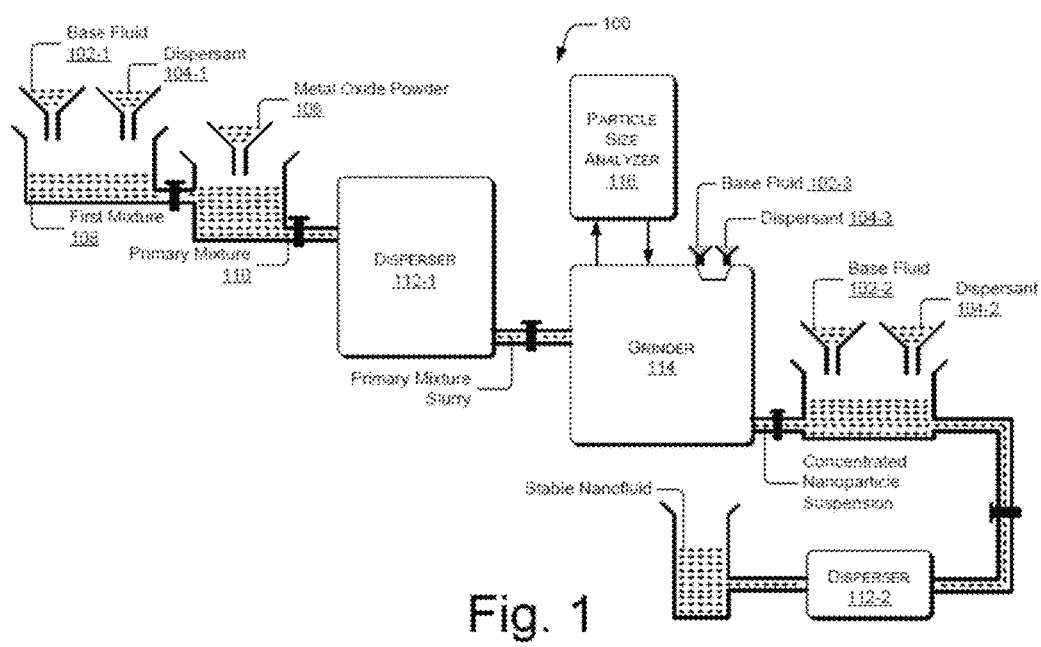
FIG. 1 illustrates a system for producing stable nanofluids, in accordance with an embodiment of the present subject matter.

It should be appreciated by those skilled in the art that any block diagrams herein represent conceptual views of illustrative systems embodying the principles of the present subject matter.

DETAILED DESCRIPTION

Method(s) for producing stable nanofluids with increased heat transfer capability are described. The methods described herein can be implemented with a variety of heat transfer liquids, such as water, water based antifreeze solutions, hydrocarbon oils, such as synthetic hydrocarbons and paraffin hydrocarbons; silicones, and the like.

Since nanoparticles possess relatively larger specific surface area, they are expected to significantly improve the heat transfer capabilities of the heat transfer fluids or base fluids. Addition of solid nano-sized particles/fibers, preferably those possessing higher thermal conductivity such as carbon, metal, and a metal oxide, into the base fluid has been found to improve the overall thermal conductivity of the base fluid in laboratory experiments. The nanofluids thus prepared at lab scale show enhanced combination of many characteristic features desired in energy systems. For example, nanofluids have increased thermal conductivity at very low nanoparticles concentrations and also show a strong dependence of thermal conductivity on temperature where the thermal conductivity is enhanced to a higher extent at higher temperatures. Similarly, nanofluids also show a non-linear increase in thermal conductivity with nanoparticles concentration and an increased critical heat flux when compared to base fluids. The enhanced properties of the nanofluids, such as the ones described above, make them desirable for heat transfer purposes and also of great importance to the HVAC industry.

Typically, for experimental purposes, nanofluids are prepared through multiple known techniques and methods such as one-step-methods and two-step-methods. A one-step-method includes direct evaporation and deposition of nanoparticles onto a low vapor pressure base fluid. In the known two-step-methods of nanofluid production, solid metallic or nonmetallic oxide particles are first reduced to nanometer sized particles, rods or tubes, and are then added to traditionally known base fluids to form a suspension of nanoparticles. Through these methods, nanofluids are produced which show better heat transfer capabilities than the base fluids.

However, the suspensions of nanofluids generally produced by the one-step-method can only be applied to produce certain type of nanofluids where vaporization of precursors of the nanoparticles is possible, and where the base fluid has a low vapor pressure. Further, the nanofluids produced using known two-step-methods and techniques tend to agglomerate and precipitate after a short duration. To counter the agglomeration and precipitation; and to keep the particles in dispersed state and make the suspension stable, several methods like physical agitation, such as magnetic stirring, ultrasonic dispersion; or use of interfacial active agent has been conventionally tried. However, the nanoparticles in the suspension still tend to agglomerate or settle over a period of time, say a few days or a few weeks, thereby affecting the stability and heat transfer efficiency of the nanofluid.

Therefore, despite the extraordinary promising thermal properties exhibited by nanofluids and known methods of their small scale production, it is a challenge to effectively and efficiently disperse the nanoparticles in the base fluids to make nanofluids in huge quantities with sustainable stability, for example, over years, and unchanged thermal properties under usage conditions, which typically involve multiple heat transfer cycles.

According to an embodiment of the present subject matter, methods for producing stable nanofluids are described. The nanofluids are prepared using heat transfer fluids, hereinafter referred to as base fluids. The base fluids that can be used for the preparation of a nanofluid may include a variety of heat transfer liquids including, but not limited to, water, water based antifreeze solutions, hydrocarbon oils, such as synthetic hydrocarbons and paraffin hydrocarbons; silicones, and the like. The heat transfer liquid may further include polyols used as coolants. Although certain heat transfer fluids have been described for the purpose of nanofluid production, it would be understood by those skilled in the art that other fluids may also be similarly used for the production of nanofluids.

According to an embodiment of the present subject matter, the particles used for production of the nanofluids include a mixture of metal oxides. The mixture may include one or more metal oxide particles and the metal oxides may include, but are not limited to, the oxides of metals like titanium, aluminum, iron, silicon, zirconium, zinc, and the like. Further, the mixture may include particles of metals, metal alloys, and combinations thereof. The average size of particles present in the mixture of metal oxides may be greater than 100 nm.

Further, dispersants are also used during the production of stable nanofluids, according to an embodiment of the present subject matter. The term 'dispersant' according to the present subject matter refers to a substance added to a medium to promote uniform suspension of extremely fine particles, often of colloidal size. The dispersants to promote uniform suspension may include any dispersant known in the art. According to the present subject matter, the dispersants may include, but are not limited to, carboxylic acids, esters, ethers, alcohols, sugar and its derivatives or polymers, phosphates, amines, and the like or combinations thereof.

In operation, stable nanofluids are prepared by the use of base fluids, a mixture of metal oxide particles, and dispersants. According to an implementation of the present subject matter, the mixture of metal oxide is ground by the process of wet milling in the presence of the base fluid and the dispersant to form a concentrated nanoparticle suspension. In said implementation, a first mixture consisting of a base fluid and small amounts of dispersant is prepared. For example, in 100 ml of base fluid, such as ethylene glycol solution, 10 gm of dispersant, such as sodium citrate is mixed. To the first mixture thus prepared, a mixture of metal oxides is added to form a primary mixture. For example, to a first mixture containing 100 ml of base fluid and 10 gm of dispersant, 40 gm of metal oxide, such as titanium dioxide is mixed to form the primary mixture. In one implementation, the mixture of the metal oxides includes the particles of average size greater than 100 nanometer (nm). In one implementation, the average particle size of the mixture of titanium dioxide may from 10 µm to 40 µm. It would be understood by those skilled in the art that the size of particles can be in the range of micrometers and millimeters where the mixture of the metal oxides is used in powdered form.

To evenly distribute the primary mixture and to form a primary mixture slurry, in one implementation of the present subject matter, the primary mixture is dispersed using magnetic stirring. The method of magnetic stirring distributes the particles of metal oxide in the primary mixture and avoids agglomeration of particles. It would be understood by those skilled in the art that different methods of dispersion known in the art, such as ultrasonication may also be used to disperse the primary mixture and to form the primary mixture slurry.

Further, the dispersed primary mixture of metal oxide, base fluid and the dispersant is ground to reduce the size of metal oxide particles. In one implementation, the primary mixture is ground using wet milling techniques. In said implementation, planetary mill is utilized to wet grind the primary mixture and reduce the size of particles of the metal oxide powder to the range of nanometers.

During the grinding of the primary mixture to reduce the size of the metal oxide particles, small amounts of base fluid and dispersant are added after every pre-determined time interval to maintain the viscosity and state of dispersion. For example, during the wet milling of a primary mixture including titanium dioxide, ethylene glycol, and sodium citrate; ethylene glycol and sodium citrate are added after every hour to maintain the viscosity and state of dispersion. According to the implementation of the present subject matter, the process of grinding and the time for grinding may vary depending upon the metal oxide powder, the base fluid used, and the choice of dispersant. For example, for a primary mixture made of metal oxide 'x', base fluid 'y', and dispersant 'z', the time of grinding may only be 30 minutes, however, for a primary mixture consisting of metal oxide 'm', base fluid 'n', and dispersant 'o', the time of grinding may be 10 hours. Hence, it would be appreciated that for different mixtures and constituents, the grinding time required to reduce the particle size to nanometers may be different and may vary for different mixtures.

The grinding of the primary mixture results in the formation of a concentrated nanoparticle suspension. The concentrated nanoparticle suspension thus produced contains a high amount of nanoparticles and the concentration may vary between 10 to 40 wt % (weight percentage), where the concentration in weight percentage reflects the weight percentage of the metal oxide particles in the primary mixture. As described before that, generally, the nanoparticles (<100 nm) in a nanofluid tend to agglomerate and precipitate. Therefore, to obtain a stable concentrated nanoparticle suspension after the grinding process, various process parameters, such as grinding time, size of grinding media, grinding media to powder ratio, primary mixture slurry concentration, and the amount of dispersants is controlled and monitored during the grinding process, as described earlier.

As described before, the primary mixture is ground till the particle size is reduced to the range of nanometers (<100 nm). In one implementation of the present subject matter, during the process of grinding, the size of metal oxide particle is analyzed after every pre-determined time period. In said implementation, the particle size is analyzed by a particle size analyzer, such as HORIBA LA-910. Once the mean particle size is observed to be lesser than 100 nm, say in a range of 40 nm to 90 nm, the grinding of the primary mixture is stopped to obtain the concentrated nanoparticle suspension.

To form a stable nanofluid from the concentrated nanoparticle suspension, the concentrated nanoparticle suspension is diluted with an appropriate base fluid and a dispersant. The concentrated nanoparticle suspension, in one implementation of the present subject matter is mixed with the same base fluid with which the first mixture is produced. Similarly, the dispersant used to form the first mixture is used to stabilize the thus formed nanofluid. The final nanofluid formed may then also be dispersed using the dispersion techniques known in the art, such as ultrasonication, and magnetic dispersion to form a stable nanofluid. However, it would be understood that a different compatible combination of base fluid and dispersant can also be used to dilute the concentrated nanoparticle suspension and produce the nanofluid.

By the use of the above described method, stable nanofluids with increased heat transfer efficiency can be produced. Also, the nanofluids produced are stable for long durations, such as weeks, months, and years. In other words, the described method produces nanofluids where the nanoparticles do not agglomerate or coagulate and stay stable for long durations. The nanofluids thus prepared also exhibit unchanged heat transfer efficiency for multiple heating and cooling cycles and are stable for several years. Further, the method may facilitate not only small scale production, but also commercial production of nanofluids and that too at reduced costs.

In many heat transfer applications, there is a critical relationship between size of a mechanical system and the cost associated with manufacturing and operation. The stable nanofluids provide increased heat transfer efficiency and the use of such stable nanofluids would result in a lesser heat exchanger surface area, thereby reducing the space required to handle a specified amount of cooling load. The use of stable nanofluids can also enable smaller heat transfer systems with lower capital costs and higher energy efficiencies.

It should be noted that the description merely illustrates the principles of the present subject matter. It will thus be appreciated that those skilled in the art will be able to devise various arrangements that, although not explicitly described herein, embody the principles of the present subject matter and are included within its spirit and scope. Furthermore, all examples recited herein are principally intended expressly to be only for pedagogical purposes to aid the reader in understanding the principles of the present subject matter and the concepts contributed by the inventor(s) to furthering the art, and are to be construed as being without limitation to such specifically recited examples and conditions. Moreover, all statements herein reciting principles, aspects, and embodiments of the present subject matter, as well as specific examples thereof, are intended to encompass equivalents thereof.

The manner in which the method(s) for producing stable nanofluids is implemented shall be explained in detail with respect to the FIG. 1. While aspects of described methods for producing stable nanofluids can be implemented in any number of different production environments, and/or configurations, the embodiments are described in the context of the following environment(s).

Further, the method described below may include different steps to produce a stable nanofluid however, it would be understood that these steps may not be necessarily carried out in the same manner and sequence described. Also, the intermediate mixtures produced at different levels and stages of the process may be produced in different batches and in various quantities to form the stable nanofluid, as would be understood by those skilled in the art.

FIG. 1 illustrates a nanofluid production environment 100 implementing a method to produce stable nanofluids, according to an embodiment of the present subject matter. The environment 100 for stable nanofluid production includes a heat transfer liquid 102-1 and 102-2, collectively referred to as base fluids 102 and individually referred to as base fluid 102, a dispersant 104-1 and 104-2, collectively referred to as dispersants 104 and individually referred to as dispersant 104. The method of nanofluid production also includes a metal oxide powder 106 which may include particles of at least one metal oxide. As described earlier, it would be understood that the base fluids 102 may include a variety of heat transfer liquids which may include, but are not limited to, water, water based antifreezes, hydrocarbon oils, such as synthetic hydrocarbons and paraffin hydrocarbons; silicones, water based antifreezes, such as glycols, alcohols, and combination thereof; polyols, and the like. Although certain heat transfer fluids have been described for the purpose of nanofluid production, it would be understood by those skilled in the art that other fluids may also be used for the production of nanofluids.

Further, the dispersant 104 may be a suitable surfactant for the chosen base fluid 102 and metal oxide powder 106. The dispersant 104 may include, but is not limited to, carboxylic acids, esters, ethers, alcohols, sugar and its derivatives or polymers, phosphates, amines, and the like or combinations thereof. Similarly, the metal oxide powder 106 may include one or more metal oxide particles and the metal oxides may include, but are not limited to, the oxides of metals like titanium, aluminum, iron, silicon, zirconium, zinc, and the like. Further, it would be appreciated that in other implementations, the mixture may include particles of metals, metal alloys, and combinations thereof.

In one implementation of the present subject matter, the base fluid 102-1 is mixed with the dispersant 104-1 to form a first mixture 108. For example, the base fluid 102-1 taken may be a mixture of Ethylene Glycol (EG) and water where both the base fluids (water and EG) are mixed in equal quantity to obtain the base fluid 102-1. Also, a dispersant 104-1, such as sodium citrate is also mixed with the base fluid 102-1 to form the first mixture 108.

The first mixture 108 thus formed is then mixed with a metal oxide powder 106 at very high loading (around 30-40 wt %), to form the primary mixture 110. In one implementation, the metal oxide powder contains only the particles of titanium dioxide ($TiO_2$) and does not include any other metal oxide particles. However, in another implementation, the metal oxide powder 106 may include particles of more than one metal oxide.

According to the said implementation, the metal oxide powder 106, added to the first mixture 108, contains particles of the metal oxide in powder form. It should be noted that the particles may not necessarily be of nanometer size. The average size of particles may also be greater than 100 nm, and be in the range of few micro meters, such as 500-100 micro meter (μm), 70-20 μm, and 0.4-0.6 μm.

Since the primary mixture 110 is made at very high loading, to avoid agglomeration and precipitation of particles of the metal oxide powder 106, the primary mixture 110 is dispersed using a disperser 112-1. The dispersers 112-1 and 112-2 are commonly referred to as dispersers 112 and individually referred to as disperser 112 hereinafter. The dispersers 112 may use any physical dispersing technique known in the art, such as ultrasonication, and magnetic stirring to disperse the primary mixture. In said implementation, the disperser 112-1 uses the technique of magnetic stirring to stir and disperse the primary mixture 110, thereby making a primary mixture slurry. Since the primary mixture slurry includes the particles of the metal oxide powder 106 in μm size, the slurry is ground to reduce the particle size of metal oxide powder 106 in the primary mixture 110 to few nanometers.

For this purpose, the grinder 114 is utilized. The grinder 114 grinds the primary mixture slurry of the primary mixture 110 to reduce the size of metal oxide powder 106 particles. According to said embodiment of the present subject matter, the primary mixture slurry is ground using the process of wet milling. Further, in said embodiment, the wet milling is carried using a planetary mill. During the process of wet milling various process parameters, such as the grinding time, size of grinding media, extend of jar filling, grinding media to metal oxide powder ratio, primary mixture slurry concentration, and the amount of dispersants, are controlled to obtain a stable concentrated nanoparticle suspension. For instance, according to the present subject matter, the grinding media of different sizes, such as 0.4 millimeter (mm), 1 mm, and 25 mm, is used; the jar is filled in between a range of 50 to 70%. Similarly, the primary mixture slurry concentration is kept between 30-40 wt % and the grinding media to metal oxide powder ratio is varied from 10:1 to 40:1. Further, the grinding time is also varied from 30 minutes to 10 hours depending upon the primary mixture 110 to form a stable concentrated nanoparticle suspension.

In the described implementation of the present subject matter the primary mixture 110 is filled in the jars of the planetary mill up to 67%. The jars are placed in the planetary mill and the primary mixture 110 is ground at 420 revolutions per minute (rpm). During the process of grinding, the size of the $TiO_2$ particles is analyzed after every predetermined time period. In said implementation, the predetermined time is one hour and the particle size is analyzed using the particle size analyzer 116. The particle size analyzer 116 may utilize different techniques of particle size analysis known in the art, such as laser diffraction technique, Acoustic spectroscopy technique, and ultrasound attenuation spectroscopy technique. In said implementation, a laser scattering particle size analyzer (HORIBA) LA-910 is used to analyze the size of particle in the grinder 114. It would be understood that in one situation, to analyze the slurry in the grinder 114, samples are removed from the grinder 114 after every pre-determined time interval. However, in another situation, the particle size analyzer 116 may be placed in line to analyze the mixture inside the grinder 114.

Further, small amounts of base fluid 102-3 and the dispersant 104-3 are added periodically to the mixture inside the grinder 114, to modify the viscosity and keep the produced nanoparticles well dispersed. The base fluid 102-3 and the dispersant 104-3 is similar to the base fluid 102-1 and the dispersant 104-1, respectively, according to an implementation of the present subject matter. In one implementation, 0.02 gm of dispersant 104-3 sodium citrate and 2 ml of base fluid 102 is added to the mixture inside the grinder 114 after every one hour. The primary mixture slurry is ground for about nine hours to reduce the size of $TiO_2$ particles. In said implementation, the size of the $TiO_2$ particles is reduced to an average size of 64 nm which is lower than 100 nm and confirms the nanostructure of the $TiO_2$ particles. Therefore, after the grinding of the primary mixture slurry in the grinder 114, a concentrated nanoparticle suspension is produced which includes the base fluid 102-1 mixed with the dispersant 104-1 and high concentration of metal oxide particles with an average size of less than 100 nm.

Thereafter, the concentrated nanoparticle suspension is diluted to form stable nanofluids. According to an implementation of the present subject matter, the concentrated nanoparticle suspension is diluted with the base fluid 102-2 which also includes an equal mixture of ethylene glycol and water, similar to the base fluid 102-1. In another implementation, the base fluid 102-2 is mixed with the concentrated nanoparticle suspension along with the dispersant 104-2 sodium citrate (0.1-1 wt %) to produce stable nanofluid with the metal oxide particles concentration of around 0.1 to 5 wt %. Although, the base fluid 102-2 and the dispersant 104-2 is similar to the base fluid 102-1 and the dispersant 104-2 respectively, however, it would be understood that the base fluid 102-2 and the dispersant 104-2 can also different from the base fluid 102-1 and the dispersant 104-1. However, the different base fluid 102-2 and the dispersant 104-2 should be compatible with each other, as would be understood by those skilled in the art. The nanofluid thus prepared is dispersed by the disperser 112-2 to evenly mix the nanoparticles of the metal oxide and provide stability to the final nanofluid. In one implementation, the ultrasonication technique is utilized by the disperser 112-2 for around 45 minutes to disperse the nanoparticles well in the final nanofluid.

According to another implementation of the present subject matter, a method for producing stable nanofluids is described. The method includes mixing a base fluid with a dispersant and a metal oxide powder to form a primary mixture where the base fluid is a heat transfer fluid and the metal oxide powder includes particles of size greater than 100 nm. The method further includes grinding the primary mixture to obtain a concentrated nanoparticle suspension where the dispersant is added to the primary mixture during the grinding after every pre-determined time period.

In said implementation, the method further includes diluting the concentrated nanoparticle suspension by adding the base fluid and the dispersant to produce a nanofluid and dispersing the produced nanofluid to form a stable nanofluid. Further, in said implementation, the metal oxide particulates of the concentrated nanoparticle suspension have an average size of less than 100 nm.

The method as described above may further include wet milling the primary mixture and analyzing, periodically, the primary mixture during the wet milling to measure the size of the metal oxide powder particulates.

The nanofluids prepared through the above described method are stable for longer duration of time periods, such as several weeks, months, and years. The nanofluids prepared in accordance with an embodiment of the present subject matter may even be stable for a duration of 18 to 24 months. The nanofluids are stable under both, isothermal, static, and thermal shocks conditions. Therefore, the stable nanofluids do not cause clogging of the pipes and also do not suffer from any drop in thermal efficiency. On the contrary, the nanofluids show good heat transfer capability with consistent stability even when used for multiple heating and cooling cycles under flow conditions. With such properties, the nanofluids can be used in automobile industries as coolant in batteries, fuel cells, engines, etc. Also the nanofluid can be utilized in electronic industry for cooling super computers and electronic equipments. Similarly, in the heating, ventilation and air conditioning (HVAC) industry the stable nanofluids can be useful for cooling purposes. Further, the nanofluids can also be prepared at large scale and for commercial purposes, in batches of more than 100 liters, without any change in their stability or heat transfer capability. Also, the nanofluids produced through the above described method can be produced at relative costs of 10-20% when compared to the commercially available heat transfer fluids.

Test Results

The method of production of stable nanofluid has been explained above with reference to FIG. 1. For the purpose of testing, several types of nanofluids with varied concentration of base fluid, dispersant, and metal oxides were prepared using the above described method. These nanofluids were tested and have shown results that are discussed below. For explanatory purposes, a sample of nanofluid was prepared by mixing 10 gm of sodium citrate into 100 ml of the base fluid. The base fluid was taken to be a mixture of Ethylene Glycol and water mixed in equal proportions. To this mixture of base fluids and dispersant, 40 gm of powdered titanium dioxide $TiO_2$ was added where the average of metal oxide particles was greater than 100 nm. The primary mixture thus obtained was then dispersed and ground using the method described in the explanation of FIG. 1. This final produced stable nanofluid along with other nanofluids prepared using the same method were then tested for stability and for the measurement of their heat transfer properties.

The results are described below are only for the purpose of explanation of the properties of the nanofluids and, are not to be construed as limiting the scope of the present subject matter. Further, the test results are shown for few types of nanofluids and should in no way be construed as the only stable nanofluids that can be formed through the described method to limit the scope of the present subject matter.

Reference is now made to the embodiments of the present subject matter, one or more examples of which are set forth below. Each example is provided by way of an explanation and, not as a limitation of the present subject matter. In fact, it will be apparent to those skilled in the art that various modifications and variations can be made in the present subject matter without departing from the scope or spirit of the present subject matter to arrive at different examples described. Thus, it is intended that the present subject matter cover such modifications and variations. It is to be understood by those skilled in the art that the present results are to explain the characteristics of the nanofluids, and is not intended limit the aspects of the present subject matter.

The nanofluids prepared with the above described method are tested for heat transfer efficiency using the shell and tube type heat exchanger. For the purpose of testing, customized double pipe heat exchangers were fabricated where the material of construction may include materials, such as glass, steel, copper, and combination thereof. For the purpose of testing, the length of the pipe was chosen to be in the range of 370 mm to 2700 mm with an inner diameter of the tube varying from 6 mm to 8 mm and wall thickness of 2 mm. It would be understood by those skilled in the art that the inner tube can either be a straight tube, or can form a coil. In the present subject matter, the inner tube used was in coil form having around 23 to 40 coils with a pitch between two coils of around 10 to 12 mm. Further, according to an embodiment of the present subject matter, the outer pipe was a straight tube with a diameter in the range of 25 mm to 100 mm which hoses with the inner coiled tube. To provide insulation from the atmosphere, the outer surface was insulated with Polyurethane Foam (PUF) and glass wool. To test the heat transfer capability of the nanofluid produced using the above described method, cold nanofluid was passed through the inner tube and heated water was passed through the outer tube to transfer heat to the nanofluid. In another implementation of the present subject matter, instead of heated water, steam was used for the purpose of heat transfer. The temperature at the inlet and the outlet of the inner tube was measured using thermocouples and recorded through a data acquisition system as a function of time. Based on the recordings, a time-temperature relation, of both the water flowing through the outer tube and the nanofluid flowing through the inner tube, was measured on a continuous basis. Although, it has been described that the cold nanofluid was passed through the inner tube and the heated water was passed through the outer tube, it would be appreciated that the flow can be in the opposite manner where the nanofluid is passed through the outer tube and the other fluid such as water is passed through the inner tube.

To analyze the data obtained in the form of inlet and outlet temperatures of the two fluids at steady state, Log Mean Temperature Difference (LMTD) and Overall Heat Transfer Coefficient (U) were calculated. As would be known to a person skilled in the art, 'U' reflects the effectiveness of the heat exchanger. In other words, higher the value of 'U', more effective is the heat exchanger. To compare the nanofluids with base fluid, the ratio of the 'U' for nanofluid to 'U' for the base fluid was calculated. The flow rates of hot water or steam were varied from 100-3300 ml/min, preferably at 200 ml/min or 2800 ml/min; while that of nanofluid was varied from 40-850 ml/min., preferably at 80 ml/min or at 830 ml/min. Several cycles of heating cooling were followed to measure the heat transfer efficiency of nanofluids.

Table 1 depicted below shows the percentage increase in the heat transfer efficiency of different nanofluids as compared to the heat transfer efficiency of the base fluid. The nanofluids exhibited 1%-60% enhancement in overall heat transfer efficiency over several heating-cooling cycles for concentrations of the metal oxide powder varying from 0.5 wt % to 5 wt % (0.25 vol. % to 1 vol. %). Further, different set ups were used to determine the enhancement in the heat transfer efficiency of the nanofluids.

TABLE 1

Enhancements in Heat Transfer Efficiency of nanofluids in different setups

| Nanofluid | Base Fluid | Enhancement in Heat Transfer Efficiency | Set up used |
|---|---|---|---|
| Alumina 1 wt % | Water | 1% to 3% | Inner tube: Copper Outer tube: Stainless Steel |
| Alumina 4 wt % | Water | 8% to 10% | Inner tube: Stainless Steel Outer tube: Stainless Steel |
| Alumina 1 wt % | EG-Water | 2% to 5% | Inner tube: Stainless Steel Outer tube: Stainless Steel |

TABLE 1-continued

Enhancements in Heat Transfer Efficiency of nanofluids in different setups

| Nanofluid | Base Fluid | Enhancement in Heat Transfer Efficiency | Set up used |
|---|---|---|---|
| Alumina 4 wt % | EG-Water | 20% to 25% | Inner tube: Stainless Steel<br>Outer tube: Stainless Steel |
| Alumina 1 wt % | EG-Water | 30% to 32% | Inner tube: Glass<br>Outer tube: Glass |
| Alumina 4 wt % | EG | 50% to 60% | Inner tube: Stainless Steel<br>Outer tube: Stainless Steel |

In Table 1, the nanofluid Alumina represents the use of Aluminum Oxide as the metal oxide powder. Further, the inner tube and the outer tube depicted in the Table 1 represent the material used for the inner tube and the outer tube in the setup to determine the enhancement in the heat transfer efficiency of the nanofluid. It will be noted that the change in the base fluid of the nanofluid changes the enhancement in heat transfer efficiency produced by the nanoparticles. It was observed that lower the conductivity of the base fluid, higher is the enhancement seen in the overall heat transfer coefficient. As presented in Table 1, the enhancement for 4 wt % alumina nanoparticles dispersed in water is around 8-10% only whereas for the same concentration of aluminum oxide nanoparticles, the Water-EG based nanofluid shows nearly 20%-32% enhancement and 50% to 60% enhancement is observed for the EG based nanofluid.

Further, it was also observed that the change in nanoparticle concentration changes the heat transfer ability of the nanofluid. For example, as the nanoparticle concentration increased in a nanofluid, the heat transfer efficiency of the heat exchanger also improved. Table 1 shows that the enhancement in overall heat transfer efficiency is increased from around 2-5% to 20-25% by increasing the concentration of aluminum oxide nanoparticles in the base fluid (EG-Water 1:1 mixture in this case) from 1 wt % to 4 wt %.

Figure 2A:
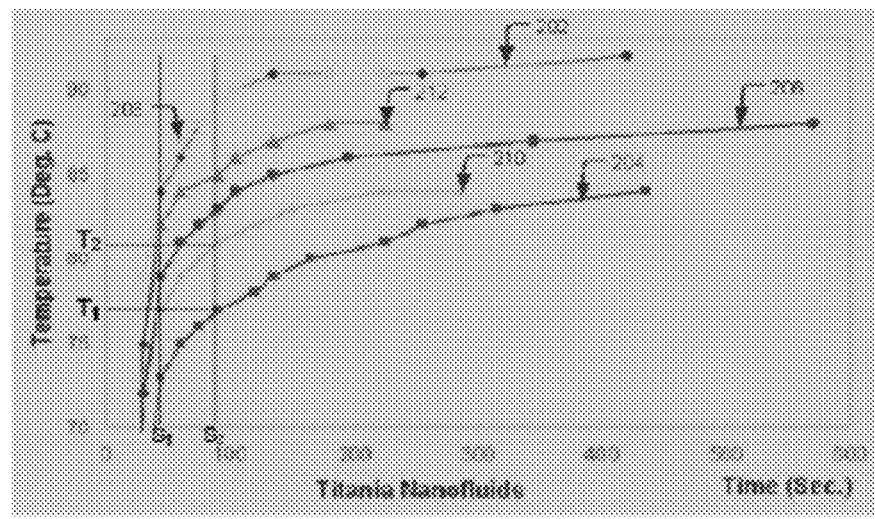
FIGS. 2(a) and 2(b) illustrates comparative time and temperature responses of base fluids and nanofluids, in accordance with an embodiment of the present subject matter.
Figure 2B:
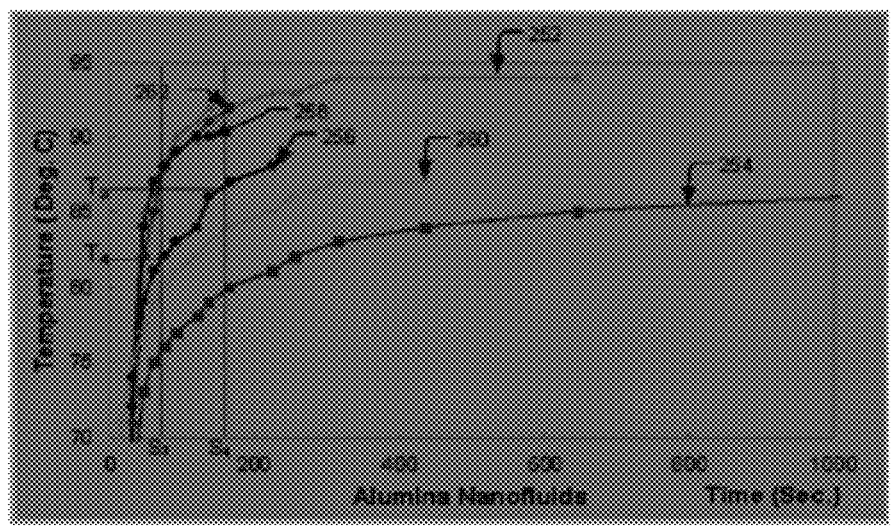

FIGS. 2(a) and 2(b) illustrate the time and temperature (T&T) response of heat transfer fluids including the nanofluids prepared from titanium dioxide and aluminum oxide respectively, in accordance with the present subject matter. The T&T response of the heat transfer fluids shown was determined using the heat exchanger system described earlier. The nanofluids of titanium dioxide and aluminum oxide were prepared using different base fluids, such as EG, water, and combination thereof. The T&T response is shown with the help of graphs which illustrates the T&T response of nanofluids and corresponding base fluids. This is done to compare the T&T of the base fluids with the T&T response of the nanofluids prepared through the described method.

FIG. 2(a) illustrates the T&T response of different heat transfer fluids. The heat transfer fluids include nanofluids prepared using titanium dioxide in different base fluids, such as water, EG, and combination thereof, and the base fluids alone. Line 202 in FIG. 2(a) represents T&T response of water. Similarly, line 204 represents T&T response of EG and line 206 represents T&T of a mixture of water and EG in equal quantity. Line 208 represents T&T of a nanofluid produced from titanium dioxide where the base fluid used is water. Line 210 represents T&T of a nanofluid produced from titanium dioxide where the base fluid used is EG. Finally, the line 212 represents T&T of a nanofluid produced from titanium dioxide where the base fluid used a mixture of EG is water in equal quantities.

As is evident from the graph, the time taken to increase the temperature of the nanofluids of titanium dioxide is less than the time required to increase the temperature of base fluids by same amount, i.e., the rate of heat transfer is greater when nanofluids are used rather than when base fluids alone are used. At low concentrations of nanoparticles, the specific heat of the nanofluid may not be different from the base fluid for all practical purposes, and so the results can be attributed to an increase in the heat transfer coefficient of the nanofluids as compared to the base fluid. For example, referring to FIG. 2(a), the increase in temperature from 70° C. to $T_1$ happens for EG, line 204, in time $S_2$, whereas, the increase in temperature from 70° C. to $T_1$ happens for the nanofluid prepared in base fluid of EG, line 210, in time $S_1$ where $S_1 < S_2$. Similarly, in time $S_2$, the temperature of EG, only changes to $T_1$ whereas the temperature of the nanofluid prepared in base fluid of EG changes to $T_2$ where $T_2 > T_1$.

Similarly, the line 206 which represents a mixture of EG and water, line 206, shows less increase in temperature as compared to the nanofluid prepared in base fluid of EG and water, represented by the line 212, in the same amount of time $S_2$. Therefore, it can be observed that in a fixed time, the increase in temperature of nanofluids is greater than the increase in temperature of the base fluid.

FIG. 2(b) illustrates the T&T response of different heat transfer fluids. The heat transfer fluids include nanofluids prepared using aluminum oxide in different base fluids along with traditional heat transfer fluids, such as water, EG, and combination thereof. Line 252 in FIG. 2(b) represents T&T response of water. Similarly, line 254 represents T&T response of EG and line 256 represents T&T of a mixture of water and EG in equal quantity. Line 258 represents T&T of a nanofluid produced from aluminum oxide where the base fluid used is water. Line 260 represents T&T of a nanofluid produced from aluminum oxide where the base fluid used is EG. Finally, the line 262 represents T&T of a nanofluid produced from aluminum oxide where the base fluid used a mixture of EG was water in equal quantities.

It can be observed in the graph represented in FIG. 2(b), the time taken to increase the temperature of the nanofluids of aluminum oxide is less than the time required to increase the temperature of base fluids by same amount i.e., the rate of heat transfer is greater when nanofluids are used rather than when base fluids alone are used. For example, following line 256, the temperature of a mixture of EG and water in equal quantity increases from 70° C. to $T_3$ in time $S_4$, whereas, the temperature of the nanofluid of aluminum oxide prepared in base fluid of mixture of EG and water increases from 70° C. to $T_3$ happens for in time $S_3$ where $S_3 < S_4$. Similarly, in time $S_3$, the temperature of mixture of EG and water, changes to $T_4$ whereas the temperature of nanofluid of aluminum oxide prepared in base fluid having a mixture of EG and water changes to $T_3$ where $T_3 > T_4$.

Therefore, it is evident form the results shown in FIGS. 2(a) and 2(b) that the nanofluids exhibit better T&T response when compared to the based fluids.

Although implementations for preparation of stable nanofluids has been described in language specific to structural features and/or methods, it is to be understood that the appended claims are not necessarily limited to the specific features or methods described. Rather, the specific features and methods are disclosed as examples and implementations for producing stable nanofluids.

We claim:

1. A method for producing nanofluids, the method comprising:
    mixing a base fluid with a dispersant to form a first mixture;
    mixing the first mixture with a metal oxide powder in the range of 30 wt %-40 wt % to form a primary mixture, wherein the base fluid is a heat transfer fluid and the metal oxide powder includes particles of size greater than 100 nm;
    grinding the primary mixture to obtain a concentrated nanoparticle suspension, wherein the dispersant is added to the primary mixture during the grinding after every predetermined time period; and
    analyzing size of the metal oxide particles during grinding after every predetermined time period.

2. The method as claimed in claim 1, wherein the metal oxide powder includes particles of at least one metal oxide.

3. The method as claimed in claim 1, wherein average size of the metal oxide particles is less than 100 nm.

4. The method as claimed in claim 1, wherein the method further comprises:
    diluting the concentrated nanoparticle suspension by adding the base fluid and the dispersant to produce a nanofluid; and
    dispersing the diluted nanoparticle suspension to form a stable nanofluid.

5. The method as claimed in claim 4, wherein the dispersing is done using one of ultrasonication and magnetic stirring.

6. The method as claimed in claim 4, wherein the heat transfer efficiency of the stable nanofluid is greater than the heat transfer efficiency of the base fluid by 1% to 60%.

7. The method as claimed in claim 4, wherein the heat transfer efficiency of the stable nanofluid remains substantially constant over multiple heating cooling cycles.

8. The method as claimed in claim 1, wherein the grinding the primary mixture comprises:
    wet milling the primary mixture; and
    analyzing, periodically, the primary mixture during the wet milling to measure the size of the metal oxide powder particulates.

9. The method as claimed in claim 8, wherein the wet milling is done using one of a ball mill and a planetary mill.

10. The method as claimed in claim 1, wherein the mixing further comprises dispersing the primary mixture to form a primary mixture slurry.

11. The method as claimed in claim 10, wherein the dispersing is done using one of ultrasonication and magnetic stirring.

12. The method as claimed in claim 1, wherein the base fluid is one of water, a polyol, a glycol, an alcohol, an oil, and a combination thereof.

13. The method as claimed in claim 1, wherein the dispersant is one of a carboxylic acid, an ester, an ether, an alcohol, sugar, sugar derivatives, a phosphate, an amine, and a combination thereof.

14. The method as claimed in claim 2, wherein the metal forming the at least one metal oxide is one of titanium, aluminum, iron, silicon, zirconium, and zinc.

* * * * *